United States Patent [19]
Müller

[11] 3,762,225
[45] Oct. 2, 1973

[54] APPARATUS FOR BALANCING MOTOR VEHICLE WHEELS

[75] Inventor: Richard Müller, Worfelden, Germany

[73] Assignee: Gebr. Hofmann KG Maschinenfabrik, Darmstadt, Germany

[22] Filed: Oct. 18, 1971

[21] Appl. No.: 189,853

[30] Foreign Application Priority Data
Nov. 11, 1970 Germany............... P 20 55 493.2

[52] U.S. Cl..................... 73/457, 73/466
[51] Int. Cl. ........................... G01m 1/28
[58] Field of Search............... 73/457, 466

[56] References Cited
UNITED STATES PATENTS
2,731,834  1/1956  Fehr et al. ..................... 73/463
3,452,603  7/1969  Kaiser et al...................... 73/466

Primary Examiner—James J. Gill
Attorney—John W. Malley, et al.

[57] ABSTRACT

An apparatus for balancing one or a pair of motor vehicle wheels while on the axle whereby the wheel is supported on a stand having a transducer mounted therein for producing a voltage signal indicating the magnitude and angular imbalance location of the wheel. The voltage signal is applied to a quadratic circuit having a frequency characteristic which falls quadratically with the speed of wheel rotation and a 90° phase lead of the output relative to the input voltage so that the output of the quadratic circuit is substantially independent of the speed of wheel rotation. The output of the quadratic circuit is applied to a measuring device which indicates the magnitude of the imbalance and to a circuit which causes stroboscopic flashes to be produced while the imbalance is at dead center bottom.

10 Claims, 5 Drawing Figures

INVENTOR
RICHARD MULLER

INVENTOR
RICHARD MULLER

BY Cushman, Darby & Cushman
ATTORNEYS

APPARATUS FOR BALANCING MOTOR VEHICLE WHEELS

This invention relates to apparatus for balancing motor vehicle wheels while on a motor vehicle axle.

In the past, apparatus has been proposed for balancing a motor vehicle wheel while it remains on its axle. In such devices, the wheel mounting of the wheel to be balanced is itself mounted on a resilient support stand and the wheel is then rotated through frictional contact with an electric motor. The vibrations produced by static unbalance are sensed at the resilient part of the stand by an electro-mechanical transducer and converted therein into electrical voltages. These electrical voltages are amplified and then displayed on a measuring instrument. The amplified alternating current voltage is also converted by a conventional trigger circuit into square-wave voltages, which are then differentiated to control an electronic flash stroboscope lamp which causes the wheel to appear stationary while it is rotating.

However, in such devices the resulting, apparently stationary angular location cannot be used directly to arrive at the angular location of the unbalance. The reason for this is that the known apparatuses of this kind generally operate super-critically, i.e., the speed of wheel rotation in the measuring operation is purposefully made higher than the resonance frequency resulting from the spring of the support stand and the weight of the vehicle. The resonance frequency therefore depends on the weight of the vehicle and the increase in resonance, that is to say, the damping, depends greatly on the condition of the shock absorbers. The damping may cause errors in the angular indication of unbalance so that several measuring runs may be necessary, and the time required to balance a wheel may be substantial. In fact, to detect the above mentioned angular errors, two measuring runs in opposite directions are often affected. From the measured angular difference between the two measuring runs, the actual angle of the unbalance can be determined.

Further, the above method can only be used however when the wheel is driven by a separate outside motor. When balancing the rear wheels of a motor vehicle, this method cannot be used since the wheel is usually driven from the engine of the vehicle itself, and thus rotation for the purpose of the balancing operation is possible only in one direction.

Apparatus has also been proposed in which the wheel mounting is mounted on an electro-mechanical transducer which is in the form of a rigid force-measuring cell and which converts the force produced by a static unbalance in the wheel into an electrical voltage. The voltage produced by the transducer increases quadratically with the speed of wheel rotation, and the phase position of the voltage corresponds to the phase position of the unbalance vector.

In this type of device, the angular position of the unbalance is determined by a stroboscope which is controlled by the integrated voltage delivered by the force-measuring cell. If the integrated measuring voltage is also used to indicate the magnitude of the unbalance, this apparatus suffers from the disadvantage that the indication is highly dependent on the speed of rotation. In order to avoid this, a second integrator is frequently placed upstream of the measuring instrument which measures the magnitude of the unbalance. This double integration of the measured value has the disadvantage that very low frequencies, produced for example by the resonance of the vehicle suspension, can affect the unbalance measuring result. An unsteady indication is often produced erroneously from small movements of the vehicle.

Measuring the unbalance of two opposite wheels of an axle at the same time is generally not possible with the above devices, as the unbalance of one wheel will cause voltages to be produced not only in the measuring device associated with that wheel but also in the measuring device which is associated with the other wheel. This cannot be avoided by an electrical frame of conventional construction, as the production of voltages in the measuring devices is dependent on the speed of wheel rotation. Therefore with these devices, the two opposite wheels of an axle must be balanced one after the other, which is also time consuming.

To measure dynamic unbalance with such previous devices, it is necessary to employ an accelerometer which is mounted, for example, on the steering rod. Mounting the accelerometer in this way usually gives rise to difficulties however, as the steering rod is generally very dirty. Thus the accelerometer cannot be locked readily on to the rod unless the rod is carefully cleaned, and this too is time-consuming. A further disadvantage is that to fit the accelerometer, the balancing operator must lie under the vehicle.

According to the present invention, there is provided an apparatus for balancing a motor vehicle wheel which includes a stand incorporating an electro-mechanical transducer, the wheel to be balanced being supported on the stand, and the voltage delivered by the transducer being used to determine the magnitude and angular position of a static unbalance. Connected to the electro-mechanical transducer is a network having a frequency characteristic which falls quadratically with the speed of wheel rotation and having 90° phase lead of the output voltage relative to the input voltage; the network measuring instrument is connected to this network for providing an indication, independent of the speed of wheel rotation, of the magnitude of the unbalance. Also connected to the network is a trigger circuit with a differentiating circuit connected downstream thereof, and an electronic flash stroboscope which is fired by the trigger circuit when the heavy unbalance point of the wheel is at precisely bottom dead center.

Embodiments of apparatus according to the present invention will now be described by way of example with reference to the accompanying drawings in which.

Figure 1:
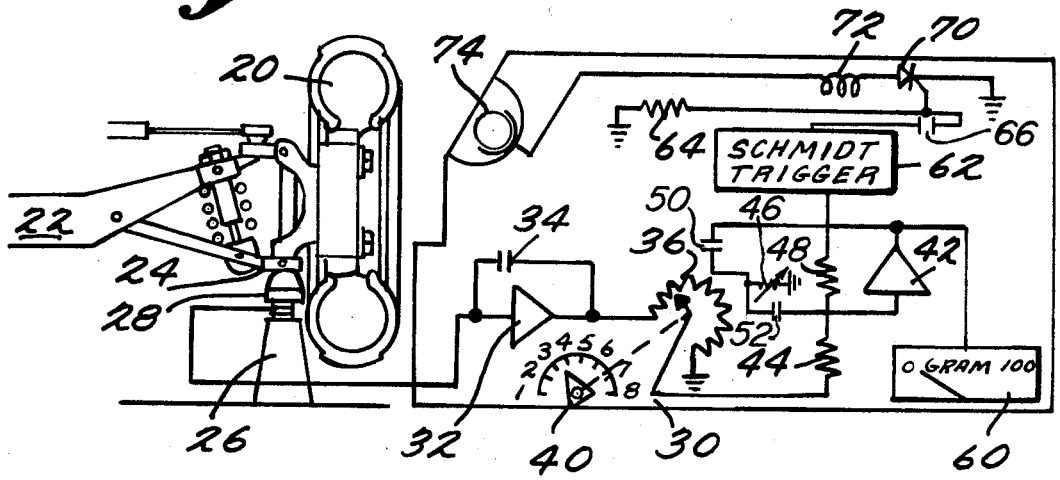
FIG. 1 shows a diagrammatic overall view of the first embodiment.
Figure 1A:
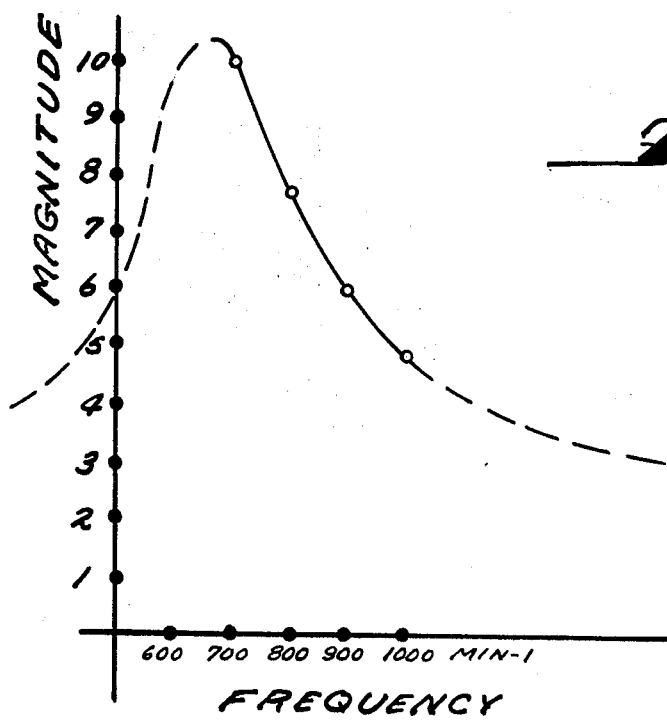
FIGS. 1a and 1b are graphs showing the frequency curve and the phase curve of the circuit of the apparatus.
Figure 1B:
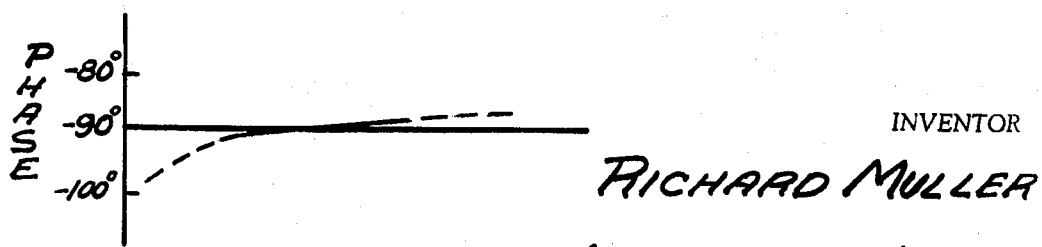

Reference will first be made to FIGS. 1, 1a and 1b. FIG. 1 shows a wheel 20 which is to be balanced in the mounted position on a motor vehicle axle 22. For this reason the wheel is supported at its wheel mounting 24 by means of a stand 26 incorporating an electromechanical transducer in the form of a force-measuring cell 28 which is connected to an input of an electronic measuring device 30, and in fact to an operational amplifier 32 having a feedback capacitor 34 to provide suitable matching to the high impedance of force-measuring cell 28. As mentioned above, the voltage delivered by force-measuring cell 28 which is produced by the static unbalance of motor vehicle 20 increases quadratically with the speed of wheel rotation and corresponds in its phase position to the phase position of the unbalance vector.

Connected to the output of amplifier 32 is a potentiometer 36 which with the total amplfication of the electronic measuring device 30 can be so adjusted by a switch 40 that, for each type of vehicle, the unbalance can be indicated in suitable units, for example in grams or ounces. Connected to the slider of the potentiometer 40 is a further amplifier 42 which is connected in the manner shown in FIG. 1 into a network comprising resistors 44, 46 and 48 and capacitors 50 and 52. The values for the elements of this network are such that for the speeds of wheel rotation employed, at which the unbalance of the wheel is measured, the amplification factor has a frequency curve which falls quadratically with the speed of wheel rotation, while the phase displacement between the input and output voltages of the network is a 90° lead of output over input. A typical frequency curve of the FIG. 1 circuit is shown in FIG. 1a, while the phase curve is shown in FIG. 1b. The solid lines indicate a typical frequency range.

Connected to the output of this network is a conventional measuring instrument 60 for displaying the magnitude of the unbalance, which is substantially independent of the speed of wheel rotation, and also a trigger circuit in the form of a conventional Schmitt-trigger circuit 62 which responds to the passage through zero of the sine wave at the output of the quadratic network by producing a pulse. The rectangular-wave voltages delivered by Schmitt-trigger 62 are differentiated by a differentiating circuit comprising resistor 64 and capacitor 66 connected downstream thereof. The resulting positive output pulses fire a thyristor 70 which produces in a firing coil 72 connected downstream thereof high voltages which fire an electronic flash tube 74. This ensures that the stroboscope flashes will always be triggered when the heavy point of unbalance of the vehicle wheel is at bottom dead center. An optical marking on the wheel, for example a chalk line, therefore appears to remain stationary while the wheel is rotating. The wheel can be set to the position corresponding to the precise angular position of the apparently stationary marking, which can be established in any suitable manner, after the wheel has again come to a standstill after the measuring operation. The balancing weight is then fitted at top dead center to the wheel, for example to the rim, the weight required for static balancing of the wheel being read off from the measuring device 60.

When balancing the undriven wheels, for example the front wheels of a motor vehicle, an electric motor is generally used to drive a friction roller which rotates the wheel at speeds which correspond for example to a vehicle speed of 100 kilometers per hour. When this speed is reached, the friction roller is disengaged, and the wheel is left to run down freely.

The quadratic network of the apparatus according to this invention has the characteristic that the output phase is always 90° leading, up to a 30 percent drop in the speed of wheel rotation, and that within this 30 percent drop, there is a transmission factor which drops quadratically with the speed of wheel rotation. At lower speeds of rotation, the transmission factor of the network declines very rapidly so that interference frequencies, which can be produced for example by the vehicle vibrating, do not affect the measuring result.

Figure 2:
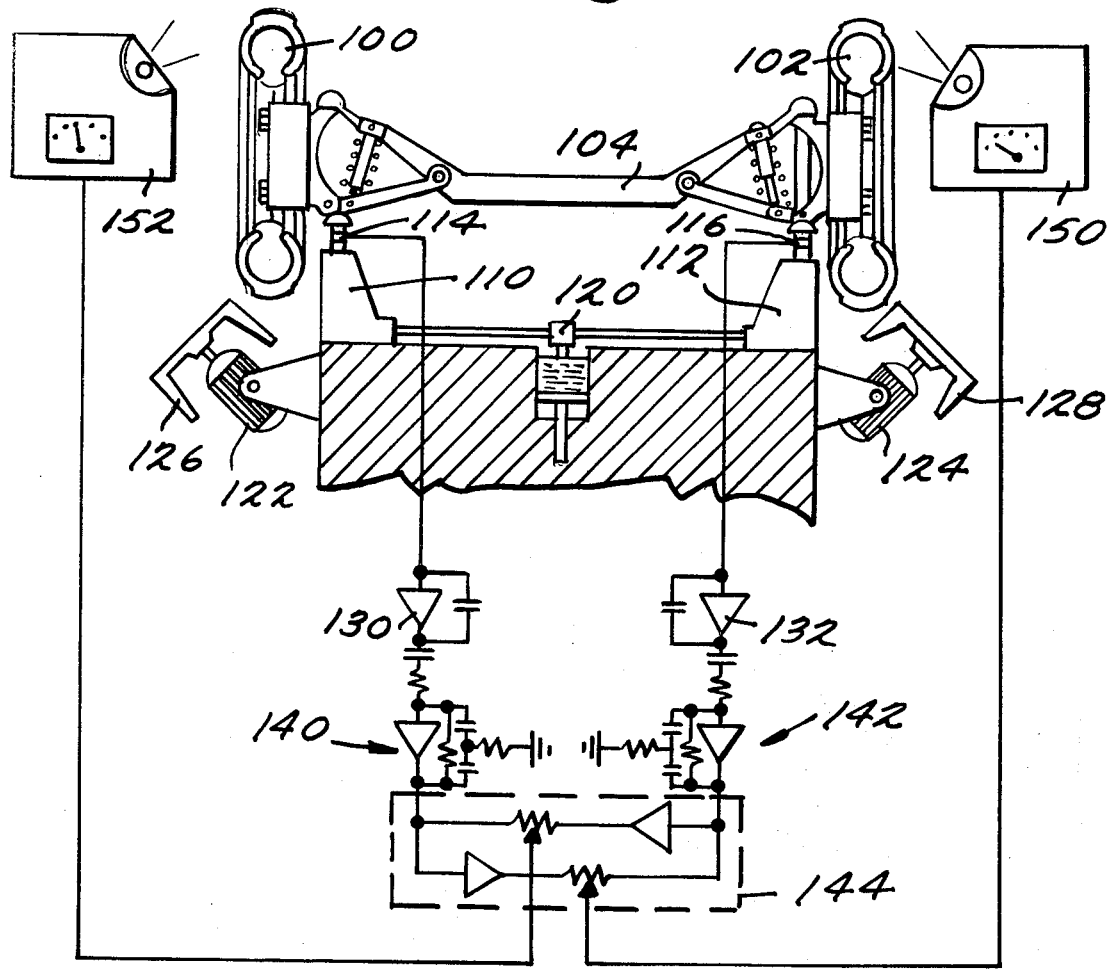
FIG. 2 is a diagrammatic overall view of a second embodiment which is used for the simultaneous balancing of two oppositely located wheels on an axle.

FIG. 2 shows an embodiment for the simultaneous balancing of the two opposite wheels 100 and 102 of a motor vehicle axle 104. As is readily apparent, the embodiment shown in FIG. 2 substantially represents a duplication of the embodiment shown in FIG. 1. Reference is therefore made to FIG. 1 as regards the parts and elements not shown in FIG. 2.

Axle 104 with its two wheels 100 and 102 is illustrated disgrammatically, in the position in which the entire axle 104 is lifted from the ground and mounted on two stands 110 and 112 incorporating conventional force-measuring cells 114 and 116 respectively. As in the case of the FIG. 1 embodiment, stands 110 and 112 support wheels 100 and 102 and the axle portions inthe vicinity of the respective wheel mounting. The axle with the two wheels is lifted free from the ground by pneumatic lift 120 illustrated diagrammatically in FIG. 2. Two electric motors 122 and 124 are provided with friction rollers 126 and 128 respectively, for simultaneously rotating the two wheels for balancing.

The two force-measuring cells 114 and 116 are preferably connected to operational amplifiers 130 and 132 respectively, which are each connected at their output side to respective quadratic networks 140 and 142, similar to the quadratic network described with reference to FIG. 1. Each network includes an operational amplifier and a number of resistors and capacitors connected so as to have frequency versus magnitude and frequency versus phase characteristic such as shown in FIGS. 1a and 1b.

The two output voltages of networks 140 and 142 are substantially independent of the speeds of wheel rotation in the speed range employed for balancing. The two voltages still influence each other however. When the two wheels are rotated simultaneously, the forces of the left-hand wheel for example, produce residual voltages at the right-hand wheel. Such interference voltages are eliminated relative to each other in known manner by means of a network 144 which is known in the balancing art as an "electric frame". The network 144 is comprised of two operational amlifiers and two potentiometers connected as shown. However, in contrast to the known electrical frame, it is not connected directly to the two transducers (cells 114 and 116) but rather is connected to the outputs of the two quadratic networks 140 and 142 respectively, with the result that voltages at the two outputs of network 144 are always related to the associated wheel. Connected to the two outputs of network 144 are two measuring devices 150 and 152 respectively, two Schmitt triggers (not shown) and two stroboscopes 34 and 35 respectively, so that the magnitude and angular position data required for the balancing of each wheel are available separately.

The quadratic network shown in FIG. 1 and the correspondingly constructed networks 140 and 142 of FIG. 2 are so-called over-bridged T-networks. In the case of this known network which is called an "over-bridged T-network", no more detailed application is specified. A similar known network (see the book entitled "Halbleiterschaltungstechnik" by O. Tietzo and Ch. Schenk, on page 206) is described as regards its properties and use as a filter with multiple negative feedback.

In contrast to the foregoing, in the above described apparatus the quadratic networks produce a transmission characteristic which falls quadratically with the speed of rotation, with simultaneous phase shift of 90°, while use is made of the frequency range above the resonance frequency.

Together with an operational amplifier, the network is provided with a band-pass characteristic, that is to say, one frequency is preferentially transmitted, while higher or lower frequencies are effectively suppressed. On the falling transmission flank towards higher frequencies, such a network has a frequency characteristic which falls quadratically with the frequency, as is shown in FIG. 1a. Within this frequency range, the phase displacement of the network is about 90°. In practice, it is important that when the speed of wheel rotation changes in the range employed for balancing, the phase shift is kept as constant as possible at 90°. For this purpose, in the apparatus shown in FIG. 1 the resistor 46 is made adjustable, its setting being selected such that the above described phase condition is fulfilled.

Preferably resistor 48 should have about 20 times the value of the resistor 46, while it is of advantage for the capacitor 50 to have about 10 times the value of the capacitor 52. The two capacitors 50 and 52 determine the resonant frequency, while the resistor 44 determines the sensitivity or amplification.

In accordance with a particularly advantageous embodiment, the resistors 48 and 46 have values of 470 and 22 kΩ respectively, while the capacitors 50 and 52 have values of 0.0047 μF respectively. The resistor 44 can in this case have a value of 47 kΩ.

Figure 3:
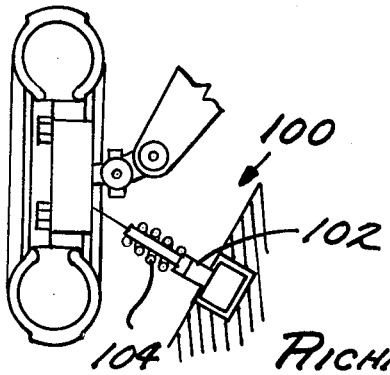
FIG. 3 shows a part of a third embodiment for determining and measuring dynamic unbalance after static unbalance has been removed.

The embodiment shown partially in FIG. 3 also permits measurement of the force couple due to dynamic unbalance, after the static unbalance of the wheel has been eliminated. For this purpose use is made of an electro-mechanical transducer 100 which is of a travel-measuring kind, i.e., it converts an oscillation movement into an electrical voltage which is dependent on the magnitude of the movement. This transducer substantially comprises a force-measuring element 102, for example a force-measuring cell, and a spring 104 arranged in front thereof. Oscillation movements at the end of spring 104 result in changes in the force applied to the force-measuring element 102. The force-measuring element 102 therefore delivers a voltage which is proportional to the distance moved by the movable end of the spring 104. Spring 104 can be suitably made to bear against a fixed part of the axle, for example the brake drum. As spring 104 is almost without weight, it follows without constraint the wobbling movements of the wheel caused by the dynamic unbalance force couple. Spring 104 only needs to be leant against the brake drum, so that complicated mounting, for example on the steering rod, is not necessary. The voltage delivered by force-measuring element 102 represents a measurement of the pendulum movements of the wheel and thus of the dynamic unbalance force couple of the wheel. This force couple is balanced out in known manner by fitting two weights in the forward and the rearward planes of the wheel, for example at the inward and outward edges of the rim, at positions at 180° to each other.

Using the force-measuring element 102, which is in the form of a force-measuring cell, in conjunction with the spring 104 as a travel measuring means, provides a simple connection to the above mentioned amplifier 32 (FIG. 1) or 130 and 132 (FIG. 2). If another device were to be used as the travel measuring means, a different way of including it in the above described electronic measuring device already provided for the purposes of static unbalance measurement, would have to be provided. Consequently, the apparatus shown in FIG. 3 is a very valuable construction due to its ease of connection to the above apparatus.

Many changes and modifications in the above embodiment of the invention can of course be made without departing from the scope of the invention. Accordingly, that scope is intended to be limited only by the scope of the appended claims.

What we claim is:

1. Apparatus for balancing a motor vehicle wheel on its axle comprising:
   an axle stand,
   a transducer mounted on said stand for producing a voltage signal indicating the magnitude and angular position of an imbalance when said wheel is supported on said stand and is in rotation,
   a quadratic circuit connected to said transducer for receiving said indicating signal and having a frequency characteristic with a magnitude which falls quadratically with the speed of wheel rotation and a 90° phase lead of the output relative to the input voltage so that the output of said quadratic circuit is substantially independent of the speed of wheel rotation,
   means connected to the output of said quadratic circuit for providing an indication of the magnitude of imbalance, and
   means connected to the output of said quadratic circuit for producing stroboscopic light flashes when a wheel is located at a given angular position.

2. Apparatus as in claim 1 wherein said light flash producing means includes a trigger circuit connected to said quadratic network, a differentiating circuit for differentiating the output of said trigger circuit and a stroboscopic flash means connected to said differentiating circuit.

3. Apparatus as in claim 1 wherein said transducer is a force-measuring cell.

4. Apparatus according to claim 2 wherein said trigger circuit is a Schmitt trigger.

5. Apparatus according to claim 2 further including connected between said transducer and said quadratic circuit an amplifier circuit for impedance matching to the high impedance of said transducer and a potentiometer, the total amplification of the apparatus being controllable by means of the potentiometer such that the magnitude of the unbalance is indicated at the measuring instrument in the desired units such as grams or ounces.

6. Apparatus as in claim 2 wherein said trigger circuit which is connected to the output of said quadratic circuit and which responds to the passage through zero of the sine voltage at the output of said quadratic circuit is connected by way of said differentiating means to a thyristor whose positive pulses fire an electronic flash stroboscope by way of a firing coil.

7. Apparatus as in claim 1 wherein said stand is adapted for supporting two wheels on an axle and further including:
- a second transducer mounted on said stand for producing a second voltage signal indicating the magnitude and angular position of an imbalance of the second wheel when said wheels are supported on said stand and is in rotation,
- a second quadratic circuit connected to said second transducer for receiving said second indicating signal so that the output of said second quadratic circuit is independent of the speed of wheel rotation, and
- means for determining the magnitude and angular position of imbalances in said second wheel from the output of said second quadratic circuit.

8. Apparatus as in claim 7 further including means for receiving said outputs of said first and second quadratic circuits and producing first and second signals compensated for first wheel vibrations detected by said second transducer and second wheel vibrations detected by said first transducer.

9. Apparatus according to claim 7 wherein said transducers are force-measuring cells, and transducers are each connected to the respective one of said two quadratic circuits by way of a respective amplifier.

10. Apparatus as in claim 1, further including, to determine dynamic unbalance, a further electromechanical transducer for measuring travel comprising a force-measuring element with a spring in front thereof, the spring having one end bearing against the force-measuring element in the unbalance measuring operation and having its other end bearing against a non-rotatable part of the axle in the vicinity of the wheel mounting, such as the brake drum.

* * * * *